June 29, 1965  H. D. CHAMBERS  3,191,964
VEHICLE SUSPENSION SYSTEMS
Filed March 22, 1962  3 Sheets-Sheet 3
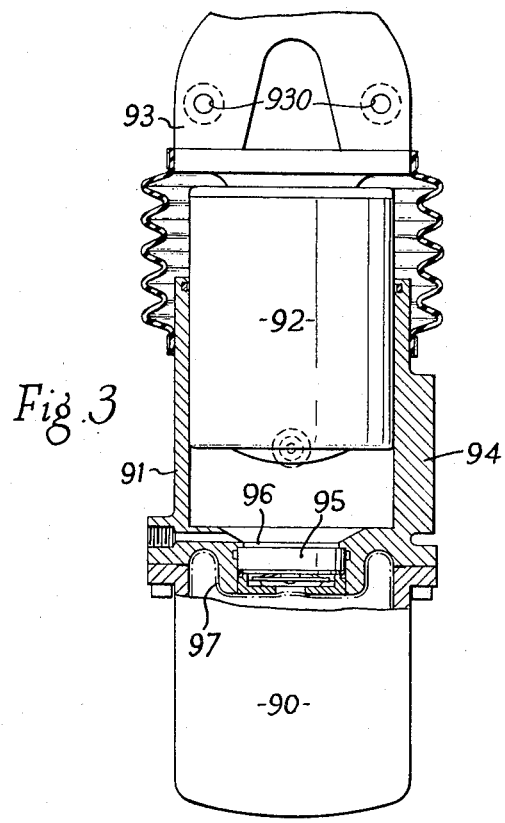
INVENTOR
Harry D. Chambers
BY Wenbroth,
Lind & Ponack
ATTORNEYS

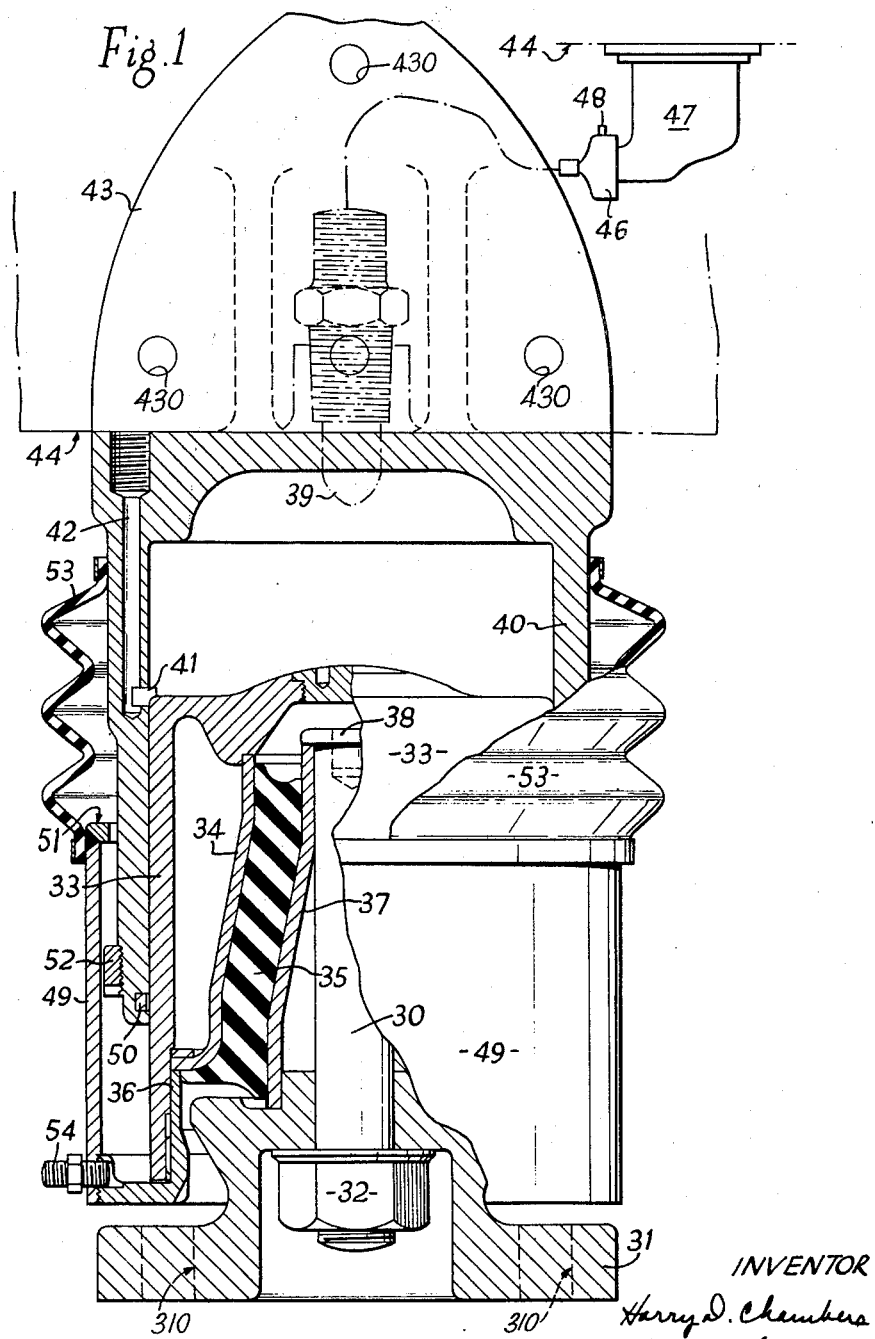

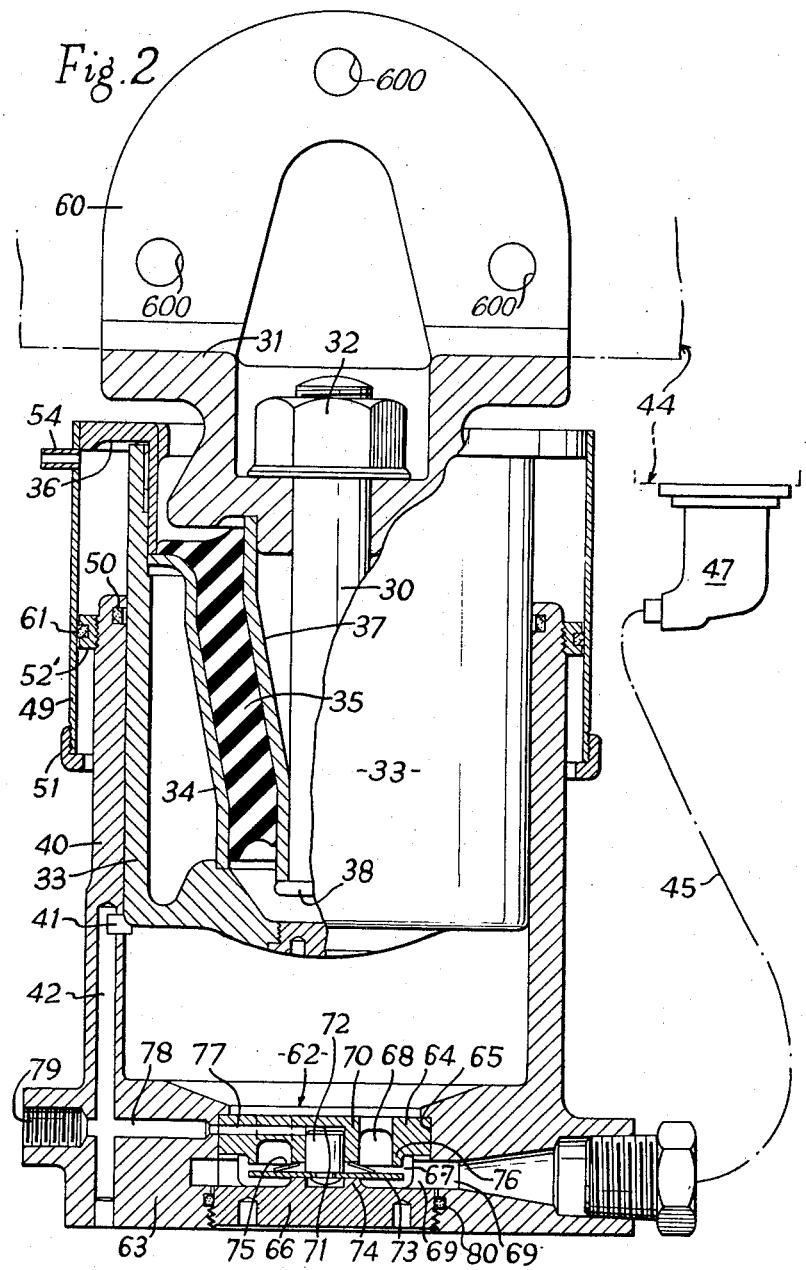

United States Patent Office 3,191,964
Patented June 29, 1965

3,191,964
VEHICLE SUSPENSION SYSTEMS
Harry Donald Chambers, Cuddington, near Northwich, England, assignor to Eaton Axles Limited, Warrington, England, a British company
Filed Mar. 22, 1962, Ser. No. 181,670
Claims priority, application Great Britain, Mar. 27, 1961, 11,192/61
10 Claims. (Cl. 280—124)

The present invention relates to suspension systems for vehicles.

Another object of the invention is to provide novel forms of hydropneumatic suspension systems in which hydraulic cylinder units are interposed between the sprung mass and the unsprung mass of the vehicle, the spaces within the hydraulic cylinder units being in communication with one or more hydraulic accumulators. In such hydraulic accumulators a mass of gas is in substantial pressure balance with hydraulic fluid. The hydraulic accumulators are preferably of the separated type, in which a piston or diaphragm is interposed between the gas, usually air, and the hydraulic fluid.

A further object of the invention is to provide novel forms of suspension systems incorporating, for each side of an axle assembly, a rigid beam attached thereto in such manner that it may tilt in relation to the sprung mass, and which is also connected to said sprung mass by a cushioning device in the form of a hydraulic cylinder unit means having a cylinder within which moves a ram which includes an elastic connection to permit the lower end of the ram to tilt in relation to the head end of the ram.

Another object of the invention is to provide such suspension system cylinder units in which said elastic connection comprises a conical elastic bushing for connecting the head end of the ram to the base end thereof; said conical bushing may comprise inner and outer conical metallic sleeves bonded to a said elastic bushing. The said inner and outer sleeves are secured one to the base end and the other to the head end of the ram. This arrangement permits the base end of the ram to move axially into the head end against increasing resistance as said rubbery member is compressed between the two conical sleeves.

It is a further object of this invention to provide a novel vehicle suspension system incorporating a rigid control arm pivotally and elastically anchored to the vehicle frame as described in the specification of my co-pending application, Ser. No. 330,110, filed December 12, 1963; that is the control arm is used in a suspension system where the rate is varied automatically with the load being carried, as is the case in a suspension ssytem using a hydropneumatic cushioning device.

In order that the invention may be more readily understood, reference will now be made to the accompanying drawings which illustrate, by way of example, hydropneumatic cushioning devices in accordance with the invention.

In the drawings:

FIG. 1 is a part-sectional vertical elevation of one form of cylinder unit, shown associated with a hydraulic accumulator fitted with a damping valve; the hydraulic accumulator is illustrated diagrammatically on a much smaller scale;

FIG. 2 is a view similar to FIG. 1, illustrating another arrangement, in which a damping valve is incorporated in the cylinder unit itself, and FIG. 3 is a part-sectional view of a combined cylinder unit and hydraulic accumulator, with an interposed damping valve.

The cylinder unit employed in any of the suspension systems described herein is preferably one which operates in accordance with the principles of my co-pending patent application Serial No. 795,258, filed February 24, 1959, now Patent 3,049,362, that is to say, one in which hydraulic fluid is supplied continuously to the cylinder unit and released therefrom whenever the ram of the cylinder unit exceeds a predetermined height in its cylinder. This end is achieved in the construction of cylinder unit specifically described in said co-pending application by providing a fluid inlet in the hollow pin by which the unit is suspended, and an outlet port in the wall of the cylinder, said outlet port being conveniently made of greater width than its height, that is, of elliptical or of rectangular shape, with the longer dimension horizontal. Relative movement of the ram and cylinder causes partial or complete closure of the outlet port to regulate release of hydraulic fluid from the cylinder unit. The same control principle is employed in the alternative forms of cylinder units illustrated in the accompanying drawings.

The cylinder unit illustrated in the last-mentioned co-pending application referred to is primarily intended for use when the associated hydraulic accumulator is carried on the unsprung part of the vehicle. When, however, the accumulator is carried on the sprung part of the vehicle, as would be preferred in some constructions, the cylinder unit may be inverted. In such case the inlet for the hydraulic fluid would be positioned in the end of the cylinder member, preferably at a position remote from the outlet port, so as to ensure a good circulation of hydraulic fluid in the cylinder unit. In such case also the mouth of the fluid return passage in the bellows space would be required to be repositioned.

An example of such an inverted cylinder unit is illustrated in FIG. 1. In this construction a solid bolt 30 upstands from a mounting block 31 adapted for attachment to an axle assembly by means of bolts (not shown) passing through holes 310, said bolt 30 being secured by nut 32. The piston 33 has a closed crown against the roof of which is located the upper edge of outer metal sleeve 34 bonded to a rubbery bushing 35; the lower flanged end of sleeve 34 rests on a flanged clamp ring 36 screwed into the lower end of piston 33. The inner metal sleeve 37, also bonded to bushing 35, is clamped between the head flange 38 formed on one end of bolt 30 and the top of mounting block 31.

The hydraulic fluid inlet 39 opens into the interior of a closed-crown cylinder 40, above piston 33, and the exhaust port 41 (preferably of rectangular shape) opens into the cylinder at a suitable distance below its crown for partial or complete obstructing by the piston; port 41 communicates with a passage 42 drilled lengthwise in the wall of cylinder 40. The crown of the cylinder 40 is secured to or formed integral with a bracket 43 whereby the cylinder unit is attached to a vehicle frame member 44 by means of bolts (not shown) passing through the holes 430 in said bracket. In this embodiment the outlet 41 is connected, via passage 42, by flexible pipeline 45 to a damping valve 46 mounted on hydraulic accumulator 47 also attached to frame member 44; the damping valve 46 also has a return outlet 48 for connection with the hydraulic fluid reservoir. A suitable form of damping valve is shown in FIG. 2.

A tubular dust shroud 49 extends up from the flange of clamp ring 36 to encircle the lower end of cylinder 40; a packing ring 50 carried by cylinder 40 bears against piston 33. A stop ring 51 is welded or otherwise secured in the mouth of the shroud 49 to co-operate with a stop band 52 screwed onto cylinder 40, the ring 51 and band 52 serving as rebound stop means. A bellows gaiter 53 extends between and encircles the upper ends of cylinder 40 and shroud 49. The outlet 54 for returning hydraulic fluid to the reservoir extends through shroud 49 for attachment to the flanged clamp ring 36.

An advantage of the arrangement shown in FIG. 1 is that with the exception of a small bore low pressure flexible tube connected to outlet 54, all piping and connections are on the vehicle frame or chassis.

Another form of cylinder unit is illustrated in FIG. 2 which structurally bears resemblance to the FIG. 1 construction, that is, the main components are of substantially the same form, but they are reversed in position as compared with those in FIG. 1; some components in the FIG. 2 construction therefore bear the same reference numbers as equivalent parts in the FIG. 1 construction. Hence, this cylinder unit bears also some resemblance to the construction illustrated in the copending application Ser. No. 795,258 referred to, in that the rubbery bushing 35, with its sleeves 34 and 37, is suspended by bolt 30 from mounting block 31, which is attached to frame member 44 by means of bracket 60, which in turn is secured to frame 44 by bolts (not shown) passing through holes 600. Another difference is the inclusion of an additional packing ring 61 carried by stop band 52' and engaging shroud 49. The cylinder 40 is secured to the axle assembly by means of bolts passing through apertured lugs or an apertured flange (not shown).

A novel feature of this embodiment is the incorporation of a compact damping valve 62 of simple construction which operates in response to pressure in the fluid system. The damping valve 62, which is built into the end wall 63 of cylinder 40, comprises a valve seating block 64 held in a recess 65 in cylinder end wall 63 by a screw-in closure block 66, which is formed on its inside with a chamber 67. The chamber 67 is in open communication with the space between the crown of piston 33 and the surrounding cylinder 40 through at least one opening 68 in seating block 64 and with the hydraulic fluid inlet 69 connected by pipeline 45 with accumulator 47.

A central boss 70 with a blind pocket 71 slidably accommodates a plunger 72 to which is riveted or otherwise secured a disc 73 supported within chamber 67 by a circular ridge 74 on closure block 66. Interposed between boss 70 and disc 73 is a star or dished spring washer 75, which biases the disc 73 to prevent its peripheral edge contacting an annular rim 76 in block 64 and thus closing opening 68.

Into the inner end of pocket 71 opens a passageway 77 in seating block 64 which leads via passage 78 in cylinder end wall 63 to join with passage 42, and thus connect both passages with an exhaust connection 79 for returning hydraulic fluid to the reservoir. An O-seal ring 80 prevents leakage of hydraulic fluid from the damping valve past the screw-in closure block 66.

An alternative arrangement is shown in FIG. 3 for use where the normal height of a vehicle frame permits, in which a hydraulic accumulator 90 is mounted directly on and coaxial with cylinder 91 of the cylinder unit, the piston 92 of which is suspended from a hanger bracket 93 similar to the arrangement shown in FIG. 2, that is by bolts passing through holes 930. In view of the extension of accumulator 90 coaxially with cylinder 91, the latter is formed with a lateral seating block 94 for attachment to an axle assembly. The interior of damping valve 95 (equivalent to the chamber 67 of the damping valve 62 in FIG. 2) is in open communication with the interior of accumulator 90 via inlet port 96. The accumulator 90 may be of any suitable construction, such as one employing a flexible diaphragm 97 to separate between air and hydraulic fluid.

Although the permissible tilting of the base of the piston relative to the axis of the cylinder unit is only about 2°, in practice it permits much or all of the horizontal acceleration and braking forces to be absorbed in the cylinder units of the suspension system, where the cylinder unit is positioned remotely from the axis about which the axle moves under such forces.

I claim:

1. A cylinder unit for a hydropneumatic vehicle suspension system, comprising a mounting member, a bolt extending from said mounting member, a piston surrounding said bolt, an elastic connection between said bolt and said piston and comprising a conical rubbery bushing, inner and outer sleeves clamped endwise between abutments on the extending end of the bolt and on said mounting member and between fixed abutments in said piston respectively, said bushing being bonded between said inner and outer sleeves, and a cylinder within which piston is slidable, said cylinder having a port therein for the admission of hydraulic fluid to and release from the space between the end of the piston and the closed end of said cylinder, the flow of hydraulic fluid through the space between said piston and said cylinder being controlled in part by obstruction by said piston of the port in said cylinder.

2. A cylinder unit as claimed in claim 1, in which a damping valve operated by differential pressure of hydraulic fluid established by communication with said space between said piston and said cylinder and with a hydraulic accumulator, is mounted in an end wall of said cylinder.

3. A cylinder unit as claimed in claim 1, and a tubular dust shroud enclosing the end of said cylinder and the portion of said piston which extends out of said cylinder end, said shroud having an abutment, and an extending ridge member on said cylinder engageable with said abutment, said abutment serving as rebound stop means.

4. A cylinder unit as claimed in claim 1, in which said cylinder unit has a coaxial extension which constitutes the hydraulic accumulator serving said cylinder unit.

5. A cylinder unit as claimed in claim 1, wherein said mounting member is mounted on the vehicle frame and the cylinder of said unit is directly attached to said mounting member.

6. A cylinder unit as claimed in claim 1, wherein said mounting member is mounted on the vehicle frame, the piston of said cylinder unit being elastically suspended on said bolt and the cylinder of said unit being attached to the axle assembly.

7. A cylinder unit for use on each side of an associated axle assembly, in a hydropneumatic vehicle suspension system, said cylinder unit being adapted to be interposed between the frame of said vehicle and said axle assembly, and comprising a mounting bracket adapted to be attached to said frame, and having a downwardly facing annular abutment surface, a bolt suspended from said mounting bracket concentrically within said annular abutment surface, an inner tapering rigid sleeve surrounding siad suspension bolt, an enlarged abutment on the lower end of said suspended bolt, said inner sleeve being clamped between said annular abutment surface and said enlarged abutment with the smaller end of said inner sleeve adjacent said enlarged abutment, an outer similarly tapering rigid sleeve concentrically around said inner sleeve, a rubber bushing bonded between said sleeves, a closed-crown piston with its crown lowermost enclosing said sleeves and bush, clamping means in the mouth of said piston for clamping said outer sleeve against endwise movement relatively to said piston, a closed-end cylinder telescopically slidable over and depending from said piston, said cylinder having a port therein for admission of hydraulic fluid to and release from a space between the closed end of said cylinder and the opposing closed crown of said piston, a damping valve at the lower end of said suspended cylinder in said cylinder port and operating responsive to a fluid pressure differential in said cylinder and on the side of said valve remote from said cylinder, and means on said cylinder for attaching said cylinder to an axle assembly.

8. In a hydropneumatic suspension system for a vehicle, a cylinder unit for each side of an associated axle assembly, each said cylinder unit being adapted to be interposed between the frame of said vehicle and said axle assembly, and comprising a mounting bracket adapted to be attached to the frame, axle assembly mounting means adapted to be attached to said axle assembly, slidable piston and cylinder members telescopically engaged, one of said members being on said mounting bracket and the other of said members being on said axle assembly mounting means, said cylinder member having a port therein for admission of hydraulic fluid to and release from a space between said cylinder member and said piston member, a bolt supported on one of said members, an inner tapering rigid sleeve surrounding said bolt, an enlarged abutment on said bolt, said inner sleeve being clamped between said one of said members and said abutment with the smaller end of said inner sleeve adjacent said bolt abutment, an outer similarly tapering rigid sleeve concentrically around said inner sleeve, an elastic material bushing filling the space between said sleeves and being bonded to said sleeves with the interposed bushing being enclosed in said piston member, and a clamping ring screwed into the mouth of said piston for clamping said outer sleeve against endwise movement relatively to said piston, the said cylinder member telescopically and slidably engaging said piston member.

9. In a hydropneumatic suspension system for a vehicle, a cylinder unit for each side of an associated axle assembly, each said cylinder unit being interposed between the frame of said vehicle and said axle assembly, and comprising a mounting bracket attached to said frame, a bolt supported by said mounting bracket, an inner tapering rigid sleeve surrounding said bolt, an abutment on said bolt, said inner sleeve being clamped between said bracket and said abutment with the smaller end of said inner sleeve adjacent said bolt abutment, an outer similarly tapering rigid sleve concentrically around said inner sleeve, an elastic material bushing filling the space between said sleeves and being bonded to said sleeves, a closed-crown piston enclosing said sleeves and bushing, means for clamping said outer sleeve against endwise movement relatively to said piston, a closed-end cylinder receiving said piston telescopically and having a port therein for admission of hydraulic fluid to and release from a space between the closed cylinder end and the piston, and means on said cylinder attaching said cylinder to said axle assembly.

10. In a hydropneumatic suspension system for a vehicle, a cylinder unit for each side of an associated axle assembly, each said cylinder unit being adapted to be interposed between the frame of said vehicle and said axle assembly, and comprising a mounting bracket adapted to be attached to said frame, a bolt on said bracket and elastic assembly on said bracket comprising concentric inner and outer rigid sleeves and an interposed rubber bushing bonded to said sleeves, said inner sleeve being mounted on said bolt, a closed-crown piston enclosing said elastic assembly, means in said piston for clamping said outer sleeve against endwise movement relatively to said piston, a closed-end cylinder engaging said piston telescopically and having a port therein for admission of hydraulic fluid to and release from a space between the closed cylinder end and the piston crown, a dust shroud carried by said piston and encircling said cylinder and being movable relative to the cylinder, packing means between the relatively movable shroud and cylinder, and means on said cylinder adapted to attach said cylinder to an axle assembly.

References Cited by the Examiner
UNITED STATES PATENTS

| | | | |
|---|---|---|---|
| 2,607,617 | 8/52 | Pringle | 287—85 |
| 2,742,302 | 4/56 | Pointer | 280—124 |
| 2,853,325 | 9/58 | Ward | 287—85 |
| 2,905,459 | 9/59 | Fikse | 280—124 |
| 2,913,252 | 11/59 | Norrie | 267—15 |
| 2,915,307 | 12/59 | Heiss. | |
| 2,927,786 | 5/60 | Templeton | 267—8 |
| 2,973,953 | 3/61 | Fikse | 267—63 |
| 2,984,478 | 5/61 | Westcott | 267—63 |
| 2,988,378 | 6/61 | Davies | 280—124 |
| 3,033,591 | 5/62 | Ward | 280—124 |
| 3,049,362 | 8/62 | Chambers | 280—124 |

MILTON BUCHLER, *Primary Examiner.*

PHILIP ARNOLD, KENNETH H. BETTS, A. HARRY LEVY, *Examiners.*